United States Patent

[11] 3,622,969

[72] Inventors Francisque Lebreton
Paris;
Jean-Paul Sarda, Rueil-Malmaison; Pierre Morlier, Paris, all of France
[21] Appl. No. 834,230
[22] Filed June 11, 1969
[45] Patented Nov. 23, 1971
[73] Assignee Institut Francais du Petrole des Carburants et Lubrifiants
Rueil-Malmaison (Hauts de Seine), France
[32] Priority July 1, 1966
[33] France
[31] 67992
Continuation-in-part of application Ser. No. 649,725, June 28, 1967, now abandoned. This application June 11, 1969, Ser. No. 834,230

[54] ACOUSTIC METHOD AND DEVICE FOR DETERMINING PERMEABILITY LOGS IN BOREHOLES
26 Claims, 20 Drawing Figs.

[52] U.S. Cl. .................................................. 340/15.5 AC, 340/15.5 SW
[51] Int. Cl. ..................................................... G01v 1/00
[50] Field of Search ........................................... 340/15.5 AC, 15.5 SW

[56] References Cited
UNITED STATES PATENTS
3,292,143 12/1966 Russell .......................... 340/15.5
3,362,011 1/1968 Zemanek ....................... 340/15.5

Primary Examiner—Rodney D. Bennett, Jr.
Assistant Examiner—Joseph G. Baxter
Attorney—Craig, Antonelli, Stewart & Hill ABSTRACT: A method and device for determining through acoustic techniques the permeability of geological formations adjacent a borehole, wherein sonic wave trains are sequentially emitted into the formations from a source moving through the borehole to different depths and the wave trains are received at a detector located in fixed spaced relationship with the source, the received signals being then measured to determine the ratio of the intensities of preselected oscillations of the received wave train which is plotted versus depth.

ACOUSTIC METHOD AND DEVICE FOR DETERMINING PERMEABILITY LOGS IN BORE-HOLES

This is a continuation-in-part of Application Ser. No. 649,725, filed June 28, 1967, and now abandoned.

The present invention relates to a method for determining a log of permeability of a section of ground traversed by a borehole, by analysis of acoustic signals which have traveled through the different geological strata of this section of ground.

The permeability of the layers of ground traversed by a borehole figures among the physical parameters the determination of which is important, particularly in the prospecting for the oil reservoirs or in the evaluation of the reserves of such reservoirs.

The permeability of a geological formation which represents the facility of passage of fluids through this formation is measured by the quantity $K$ which is defined by the expression:

$$Q = \frac{-KS}{\mu} \frac{dp}{dx}$$

or, which is equivalent by the volume of fluids per unit of time, passing through a ground section having one face offered to the passage of the fluids equal to $S$ and having a thickness $e$ when the pressure difference is $dp$ between the faces of this ground section, located at a distance $dx$ from each other.

$K$ is generally expressed in millidarcys and its value varies between 0.1 millidarcy and a few darcys.

The ration $K/\mu$ is frequently referred to as mobility.

The method according to the invention is an acoustic well-logging method, wherein repetitive acoustic impulses from a source are each detected at a detector which is moved through a borehole in fixed spaced relationship with said source to produce electrical signals, each having a first portion, representative of a first arriving compressional wave having at least one component and a second portion representative of a later arriving shear wave having at least one component.

Each of said waves is formed of a series of successive arches, the term "arch" being used throughout this specification to designate the substantially sinusoidal wave form of a half-cycle of oscillation.

An acoustic impulse of the type of those emitted in a borehole when acoustic diagraphs are carried out, i.e., having the form of a damped sinusoid, is propagated in different modes in the ground or rock formation surrounding the acoustic emitter.

Among these modes of propagation, those skilled in the art, distinguish between the longitudinal or compressional mode furnishing a first portion of the signal collected by an acoustic receiver being placed at a certain distance from the emitter, and the transverse or shearing mode furnishing a second portion of the signal collected by the acoustic receiver.

To these modes of propagation correspond two clearly distinct speeds of propagation—and specifically $V_c$ for the compressional mode, and $V_t$ for the transverse mode—such that the ratio $V_c/V_t$ be comprised between 1.6 and 2, the exact value of the aforementioned ratio depending upon the nature of the ground or rock formation being traversed.

It is thus possible, to obtain, on a log of the signal received as a function of time, a separation of the compressional portion and of the transverse portion of this signal by taking into account the difference of the speeds of propagation thereof, as will be set forth hereinafter on the basis of an example.

A more intensive study of the propagation of acoustic impulses in the zones of ground or rock formation surrounding a borehole must further take into account the fact that the configuration of the soil in proximity to the borehole may have been changed due to the action of the fluid having served for drilling the wells or shafts, particularly in the case of porous rock formations which are permeable or adapted to be altered by the mud, if the drilling fluid or mud being utilized is of a nature to filter into the soil causing an invasion or impregnation of the ground or formations surrounding the well up to a certain distance from the wall thereof, it being understood that this mode of impregnation depends upon the characteristics of the rock formations and upon the drilling mud.

This impregnation is limited by a certain clogging of the rock formations, in the immediate vicinity of the wall of the well, by the particles contained in the drilling mud and whose diameter is smaller than that of the pores of the formations traversed by the mud (this mud being called "filtrate mud" in contrast to certain muds or slimes which are very viscous), or "without filtrate," which do not cause an impregnation of the soil around the wall of the well.

Experiments have shown that the thickness of the zone being clogged by a filtrate mud could exceed several centimeters, the total thickness of the formation impregnated by the filtrate of the mud naturally being much higher.

Under the most ordinary conditions, the acoustic diagraphs carried out in boreholes drilled with filtrate muds will furnish signals in which the compressional wave may comprise two components, the first one of which corresponds to the longitudinal propagation of the signal being emitted in the zone of small thickness clogged by the drilling mud in proximity to the wall of the borehole, and the second one of which corresponds to the longitudinal propagation of this signal in the rock formations surrounding this clogged zone, this signal being reflected by the interface between the zone impregnated by the filtrate and the virgin zone.

The first component of the compressional wave has amplitude which will be the more reduced the lower is the thickness of the clogged zone. Under the same conditions (well drilled with filtrate mud), the transverse wave of the signal being received may comprise two components corresponding respectively to the transverse propagation of the signal emitted through the zone clogged by the drilling mud, and to the transverse propagation of this signal in the impregnated zone surrounding the clogged zone, the latter component originating from a reflection of the signal by the interface mentioned above.

The second transverse component whose passage or path in the soil is very long may in certain cases be confused at the reception with the last portion of the signal being received corresponding to the propagation of the signal in the drilling fluid itself along the wall of the well (the speed of propagation in this fluid is generally lower than the transverse speed of propagation).

When one carries out acoustic diagraphs along boreholes drilled with filtrate muds, it is important to be able to separate the two components of the compressional wave of the signal being received.

The speeds of these two components are rather close with respect to each other, yet it is possible to identify the different arches appertaining to each of these waves by carrying out a series of measurements with the same emission frequency, but using different spacings between the acoustic emitter and receiver for the purpose of varying the difference of the passages or paths between the component which is propagated in the clogged zone having a small thickness and surrounding the borehole, and that which is reflected by the interface separating the zone of impregnation of the rock formation by the filtrate of the drilling mud from the virgin zone (this difference of the passages or paths being proportionally greater for a small spacing between the acoustic emitter and receiver).

When the emission frequency is changed, this variation of the difference of the passages or paths will be shown or expressed on the logs by displacements of the arches of one of the components of the compressional wave with respect to those of the other component and will thereby allow for a distinction between these arches.

It is equally possible to separate the two components of the compressional wave by causing the emission frequency to vary for the same spacing between the acoustic emitter and receiver. It will be possible particularly to utilize an elevated emission frequency with a view toward more effectively separating these two components from each other and from the transverse component of the signal. In fact, the total number of arches or alternations to be received for each component remaining the same for the same number of arches being emitted (same type of emitter) whatever the emission frequency, the reduction of the period of these alternations will involve a decrease in the width of the different components, thereby allowing for separating the same.

In actual practice, it is possible to combine these two steps, and to carry out, for example, two measurements, one with a short spacing between the acoustic emitter and receiver (for example 2 feet) and an elevated emission frequency (up to 80,000 Hertz, for example), and the other with a long spacing (for example 9 feet) and a relatively low emission frequency (12,500 Hertz, for example).

The eventual separation of the two components of the transverse wave of the acoustic signal received will be facilitated by the fact that these two components each present an arch of maximum amplitude when it is thus possible to distinguish, (in order to prevent the risks of error originating from an accidental cutting of the arches by the measuring apparatus, one may substitute for the determination of the amplitude that of the slope of the tangent at the origin or inflection point of each arch, this slope varying like the amplitude of the arch).

In any event, once the two compressional waves have been separated on the log, it is possible on the basis of the latter to separate from each other the two transverse waves which correspond to the same zones being traversed since it is known that the value of the ratio $V_c/V_t$ as defined above is the same in each signal for these two pairs of components of compressional and transverse waves corresponding to the same zones being traversed, and is comprised between 1.6 and 2.

It is one object of the present invention to propose a method which renders it possible to establish acoustic permeability diagraphs of different zones of geological formations traversed by the different acoustic waves indicated hereinabove.

It is another object of the present invention to determine for these different formations a parameter characterizing quantitatively the degree of cracking of each formation, allowing to determine the role played by the cracks in the global permeability of these formations, while considering only the open cracks.

It has already been proposed in U.S. Pat. No. 3,362,011 that acoustic permeability diagraphs be obtained by determining the ratio of the maximum amplitude of the compressional wave to the maximum amplitude of the transverse wave.

This prior art proposal is based on the hypothesis that the compressional wave would alone be affected by the permeability of the geological formations traversed by the acoustic signals, which would thus allow for utilizing the transverse wave as standard to obtain a ration independent of any exterior, possibly uncertain factor. It has, however, been found that this prior art method did not furnish really valuable indications regarding the permeability of geological formations traversed by a borehole, and that the measurements supplied were markedly affected particularly by the clay content of the formations, this prior art method indicating elevated values of permeability for the argillaceous formations, whereas these formations—although very porous—are practically impermeable by reason of the small diameter of the pores thereof ("-false permeability").

Accordingly, it is an essential object of the present invention to provide a method for obtaining acoustic diagraphs which are not affected by the false permeability of the argillaceous formations.

It is an additional object of the present invention to propose a method for obtaining acoustic diagraphs furnishing information or data on the permeability of the geological formations traversed by a borehole from the transverse wave of the acoustic signals received.

A still further object of the invention is to make it possible to measure the variation of the coefficient $K/\mu$ for a zone of the formation surrounding the borehole as a function of the distance to the wall of the borehole, at a fixed level of this borehole, so as to ascertain the lateral variations in the viscosity of the fluids impregnating the formations which surround the borehole.

Further objects and advantages of the present invention will become apparent from reading the examples for carrying out the present invention which will be described hereinafter with reference to the accompanying drawings, wherein FIG. 1 diagrammatically shows a logging sonde including means for transmitting acoustic pulses into the formation traversed by a borehole and means for detecting corresponding acoustic signals, in fixed relationship to the transmitter means.

FIG. 10 is a block diagram of a fully automatic device for carrying out the method according to the invention, FIG. 11 partially illustrates an alternative embodiment of such a device.

Figure 1:
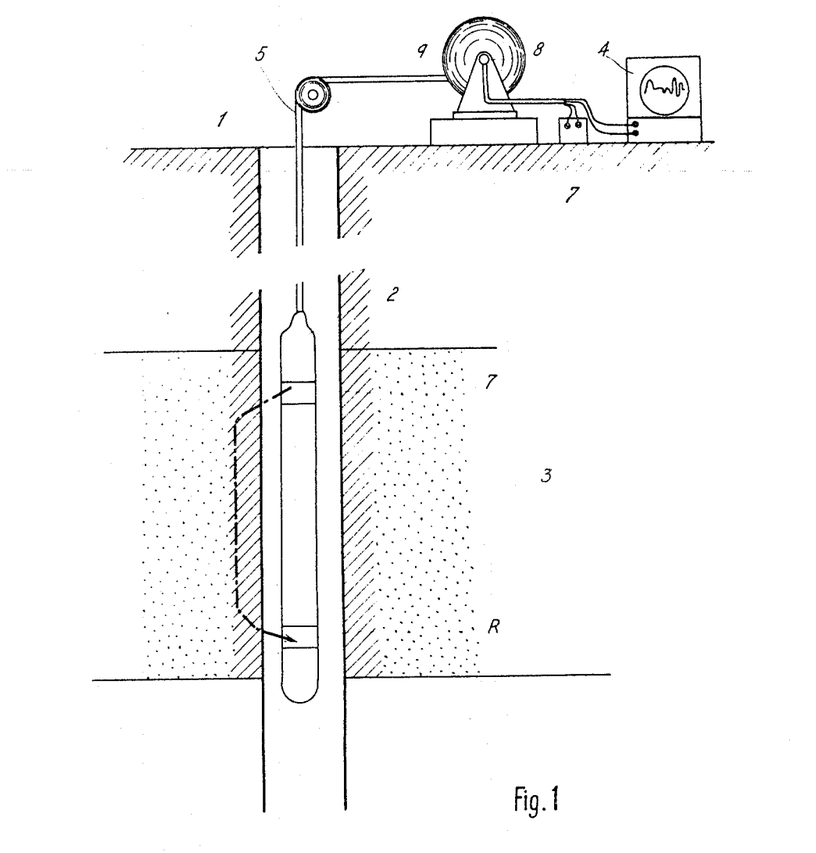

FIG. 1 diagrammatically shows an embodiment of a device which can be used for vibrating through acoustic waves the formations traversed by a borehole 1.

This device includes a logging sonde 2 which is lowered in the borehole to the level of the studied geological formation 3. This sonde is provided with an acoustical wave transmitter T and a receiver R, which may be of the magnetostrictive type, like the transmitter T.

The transmitter T emits in all directions, for example 10 to 20 times per second, sonic pulses which are received by receiver, R after propagation in the explored formation 3, in the vicinity of the borehole, the control of the emission being achieved by an electronic device 7 for effecting periodic control, this device being for example located at the ground surface.

In order to avoid the reception by receiver R of sound waves transmitted through the body of the logging sonde 2 itself, the part of this sonde which is located between T and R is so built as to provide a low velocity of propagation of the sound waves (it may, for example, be provided with a central mandrel made of a plastic material) and the reception by receiver R is limited to a small time interval following the emission by T. In this way the waves transmitted through the body of the sonde do not perturb those transmitted through the formation 3.

Figure 1A:
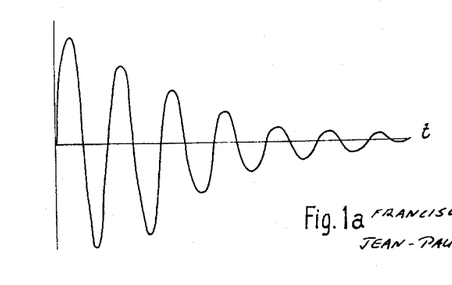
FIG. 1a shows the type of acoustic signal most frequently used at the emission.

For carrying out logging according to the invention the emitted sonic pulses will for example have frequency spectra comprised within the range from 1 kilocycle to 1 megacycle and in particular from 20 to 30 kilocycles. The emitted pulses will, for example, have the form of a damped sinusoid, as illustrated by figure 1a which represents, as a function of time, the variations in the amplitude of this pulse.

The corresponding wave train, picked up by the receiver R appears on the screen of the oscilloscope 4 connected to the logging sonde through the electric cable 5.

The electrical connection between, on the one hand, the oscilloscope 4 and the device 7 and, on the other hand, the corresponding electrical conductors of the cable 5 may be effected in a conventional way be means of connecting rings insulated from each other and fixed on the shaft 8 of the winch 9 on which the cable 5 is wound.

These rings are respectively connected to conductors of the cable 5, and brushes, which are respectively connected to the oscilloscope 4 and to the device 7, and rub against these rings.

Figure 1B:
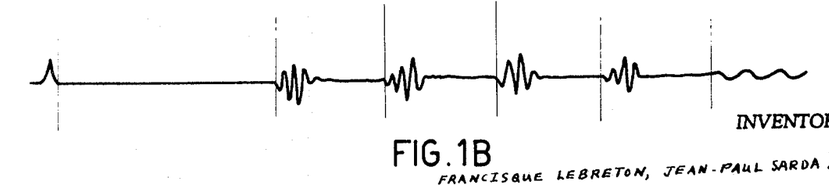
FIG. 1b and 1c illustrate respectively two wave trains detected by the receiver of the sonde at the same level of the borehole and corresponding respectively to two different frequencies of emission.

FIG. 1b illustrates, in the case of a diagraph carried out in a well drilled with a filtrate mud, one form of acoustic wave train detected by the receiver R at one level of this well by using a relatively elevated emission frequency (for example 50,000 Hertz) so as to obtain a clear separation of the different components $C_1$, $C_2$, $T_1$, $T_2$, and L of the wave train received, representing respectively the two components $C_1$ and $C_2$ of the compressional wave, the two components $T_1$ and $T_2$ of the transverse or shear wave, and the wave L obtained by propagation of the signal emitted through the drilling mud along the wall of the well. Taking into account the range of speeds of propagation of the compressional and transverse waves, the arrival of the transverse wave is effected (or takes place) between the instant $1.6\Delta t$ and the instant $2\Delta t$ if $\Delta t$ represents the time interval separating the instant of emission chosen as origin from the beginning of reception of the compressional wave.

A second log has been effected, (FIG. 1c) for the same spacing between the emitter and the receiver of the sonde but using a lower emission frequency, for example in the neighborhood of 2,500 hertz, assuring a good penetration of the acoustic signals in the rock formations surrounding the well, this second emission frequency being chosen so that the different components of the wave train, being clearly separated thanks to the first log (FIG. 1b), be brought closer together this time until they are essentially contiguous with respect to each other. A slight spacing between these components on the log of FIG. 1c will be allowed for, or on the contrary a slight overlapping or covering of the successive components of the wave train, provided that the two successive arches of each component retained for establishing the ratio of the amplitudes according to the method of the present invention which will be developed hereinbelow be not affected by this covering.

Figure 1C:
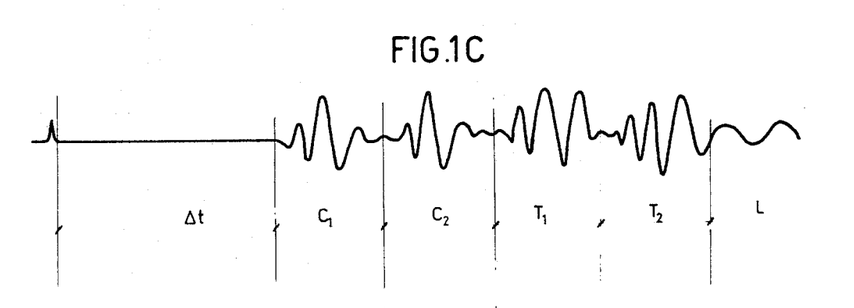

It the recordings of FIGS. 1b and 1c are placed opposite each other as shown, it is easy to transfer to the recording of FIG. 1b the beginnings of the different components of the wave train clearly apparent from FIG. 1c. According to the present invention, one obtains permeability diagraphs of rock formations traversed by the different waves received from the signal by determining the ratio of parameters linked to the amplitude of particular successive arches appertaining to the same wave of this signal.

For purposes of simplification, the case will now be considered where the acoustic signals received comprise a compressional wave and a transverse wave, each having only one component (the case of a borehole having been drilled with a mud without filtrate), but it should be understood that the steps of the method according to the present invention being applied in the following examples to the compressional wave of the acoustic signal received could be applied to either or to each of the two components of the compressional wave in the case of a borehole having been drilled with a filtrate mud, and that likewise one could apply to either or to each of the two possible components of the transverse wave the steps of the method according to the present invention which are applied in the following examples to the transverse wave, and specifically in order to obtain data concerning the permeability of the different zones of rock formations respectively traversed by each of these waves or components of acoustic waves.

Figure 2:
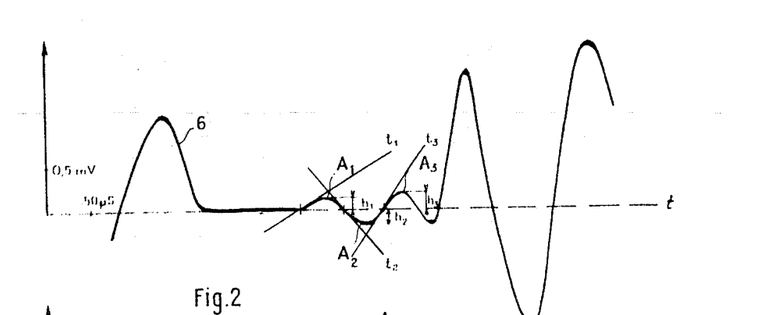
FIGS. 2 and 3 illustrate two further examples of wave trains picked up by the receiver of the logging sonde and analyzed according to the method of the present invention.
Figure 3:
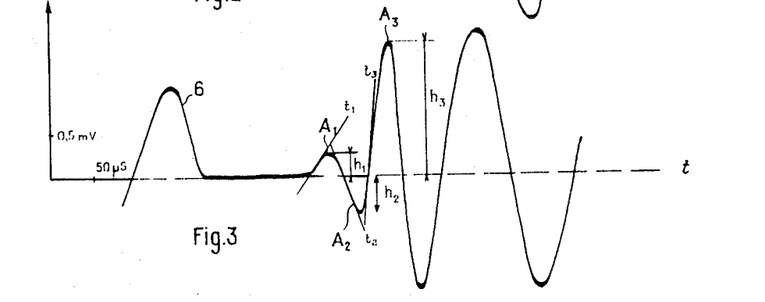

Two examples of the shape of the wave train which may be picked up by the receiver R are shown by FIGS. 2 and 3 respectively.

These figures show the amplitude (in millivolts) of the acoustic detected by the receiver R, as a function of time (in microseconds).

Each of the wave trains of FIGS. 2 and 3 is preceded by a first peak 6 recorded at the instant of emission of the acoustic pulse arriving at the receiver through conductor means provided therefor from the transmitter T.

The compressional or longitudinal wave is the faster and it may therefore be assumed that the first arches $A_1$ and $A_2$ and $A_3$ of the wave train belong exclusively to the longitudinal wave.

Picking up by means of the receiver R the wave trains corresponding to an identical transmitted k pulse for different levels of the sonde and measuring each time one of the ratios: $I_c = h_3/h_1$, $I'_c = h_2/h_1$, of the peak amplitudes of two of the first arches, such as $A_1$ and $A_3$, or $A_1$ and $A_2$ of the received train, it has been discovered that there exists a very close correlation between such a ration and the value of the ratio $K/\mu$ or mobility, wherein $k$ is the permeability of the formation 3 at the level of the sonde 2 which has produced this wave train and the viscosity of the fluid impregnating this formation, this ratio being separately determined in a conventional way on samples or plugs collected at the different levels. 3

The peak amplitudes $h_1$, $h_2$, and $h_3$ are obviously dependent on the maximum amplitude of the sonic wave emitted from T but the ratios $h_2/h_1$, $h_3/h_1$ are independent of this maximum amplitude and thus by measuring one of these ratios on the acoustical wave trains received by R corresponding to different levels of the sonde in the borehole according to the invention, it is possible to quantitatively determine the permeability of the formations traversed by the borehole all along this borehole, or, more precisely, the above-defined ratio $K/\mu$.

Figures 4, 5:
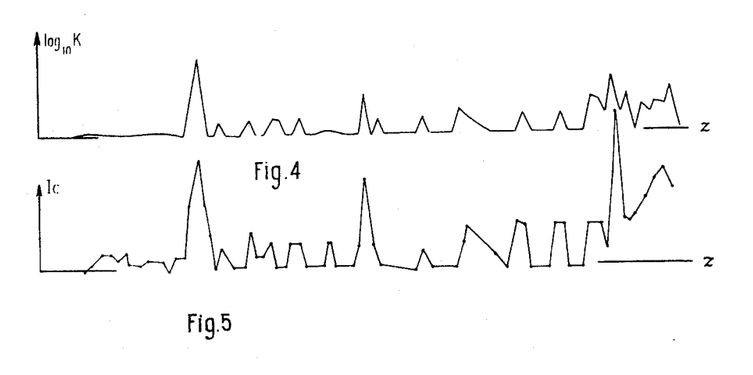
FIG. 4 shows, as a function of depth, the common logarithm of the permeability of formations traversed by a borehole.
FIG. 5 shows for comparison purposes the permeability log established for the same borehole by following the method according to the invention, FIGS. 6 and 7 shown two acoustic wave trains wherein there has been isolated the arch of maximum amplitude of the shear wave, as well as the two arches adjacent to this arch of maximum amplitude.

By way if illustration, FIG. 4 shows as a function of the depth z, the value of the common logarithm of the permeability of the formation traversed by a borehole (permeability measured on samples or plugs collected at regular intervals of 33 cm. along the borehole during this test) and FIG. 5 represents the variations of the ratio $I_c = h_3/h_1$, the depth being in correspondence on the two diagrams.

In this example the acoustic wave trains (FIGS. 2 and 3) reaching the receiver R of the sonde have been recorded for various depths of this sonde by photographing with a camera synchronized with the oscilloscope 4, the pictures appearing on the screen of the latter, each 30 cm. approximately during the raising of the sonde.

It can be seen that the correlation between the curve of FIG. 4 and the log of FIG. 5 obtained by following the method according to the invention is particularly remarkable.

The relation between the ration $I_c = h_3/h_1$ and the quantity $K/\mu$ is of the type $$I_c = \alpha \log_{10} \frac{K}{\mu} + \beta$$

wherein $\alpha$ and $\beta$ are numeric coefficients of substantially constant values for a given borehole.

$I_c$ may thus be chosen as a measurement of the ratio $K/\mu$, wherein $K$ is the permeability of the formation located in the vicinity of the sonde and the viscosity of the fluid impregnating this formation.

If the formation is isotropic, $I_c$ will measure the true mobility.

If the formation has an isotropic matrix having fractures of sufficient spacing, the so-measured mobility $K/\mu$ will be that of the matrix separating the fractures.

If the fractures of the formation are very close to one another, $I_c$ will measure the overall permeability, taking into account both the permeability of the matrix and the permeability due to the fissures.

Moreover, in the case of a nonistropic formation having different permeabilities in the vertical and the horizontal directions, it can be assumed that $I_c$ will represent fairly well the vertical permeability of the formation, since the compression wave is propagated vertically.

It has been furthermore verified that the permeability logs determined according to the present invention were not perturbed by the presence of clay in formations traversed by the borehole in contact to the logs obtained before this invention. This result is remarkable since as the shaly formations exhibit a high porosity but have pores of very small diameter, it was feared that the porosity of these formations might make false the interpretation of some parts of the permeability log which would appear as corresponding to ground layers of a high permeability, while these layers are in fact impervious ("false permeability").

Figure 13:
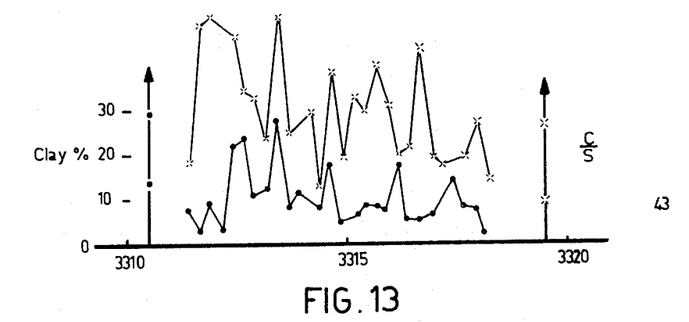
FIGS. 13 and 14 are comparative experimental logs obtained respectively by following a prior art method and the method of the invention, together with diagrams representing the variations in the clay content of the geological formations as a function of depth.
Figure 14:
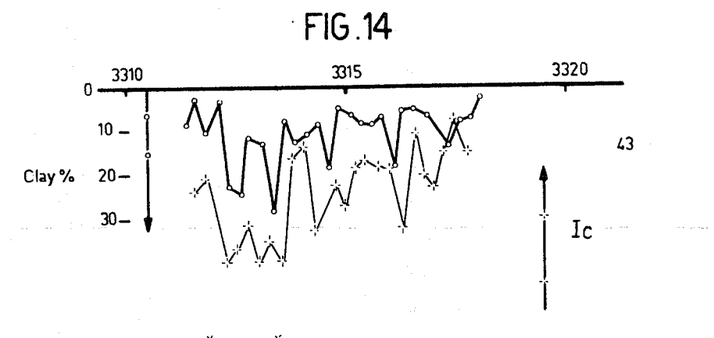

FIGS. 13 and 14 show comparative logs obtained respectively by following the above-indicated prior method described in U.S. Pat. No. 3,362,011 (FIG. 13) (according to which there is measured the ratio C/S of the maximum amplitude of the compressional wave to the maximum amplitude of the shear wave) and the above-indicated method according to the invention (FIG. 14) for obtaining a log of our above-defined $I_c$ index.

These logs were determined in a Hassi-Messaoud well in the Sahara Basin over the rather shaly sandstone 3,312–3,318 meters interval of this well. Along this interval the variations in the clay content have been determined from plug thin sections and plotted against each of the prior art C/S index (FIG. 13) and our $I_c$ index (FIG. 14) these variations being represented in both FIGS. 13 and 14 by the curve referenced 43. FIGS. 13 and 14 clearly show that the high values of the C/S ratio determined according to the method of the above-indicated prior patent often correspond to the high values of the clay content and are thus found in zones of low permeability, while the value of our $I_c$ permeability index is always low when the clay content at the considered depth is high.

As hereinabove indicated, it will equally be possible, without departing from the scope of the invention to establish a log of the mobility $K/\mu$ by determining at different levels, instead of ratios of the maximum amplitudes of two arches of the wave train selected from the three first arches reaching the receiver, the ratio of the respective values, for the two selected arches of the received wave train, of another parameter related to the peak amplitude of each of these two arches respectively.

This ratio may for example be that of the slop of the tangent $t_3$ to the slope of the tangent $t_1$ (FIGS. 2 and 3) at the respective points of the two arches $A_1$ and $A_3$ corresponding to the beginning of the reception of each of these arches or preferably at their respective points of inflexion or also the ratio of the slop of the tangent $t_2$ to that of the tangent $t_1$, $t_2$ being the tangent to the arch $A_2$ at the point thereof corresponding to the beginning of the receiving of this arch or at its point of inflexion.

Since the permeability of a formation is not only a function of the permeability of its matrix but also of the degree of cracking of this formation, when considering only the open fractures, it is important to have the possibility to associate such a log as that shown by FIG. 5, determined by following the method of the invention with a log representing the variations of the degree of cracking all along the borehole.

Actually such logs of fracturation are most of time obtained by observing plugs collected at different levels.

The experimentalist plots on a diagram the number of fractures or cracks in the plugs corresponding to ground sections located at increasing depths, the average opening of the fractures in each of these sections, the direction of these fractures, referred to three types: horizontal, vertical, and oblique direction and notes at least the ventual plugging of these fractures.

Figure 8:
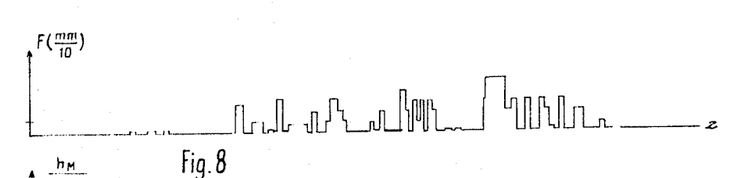
FIG. 8 is a diagram representing the degree of cracking of formations traversed by a borehole, determined through direct measurements on ground plugs.

Such diagram of cracking is shown by FIG. 8 wherein the ordinate is for each studied ground section equal to the product F of the number of cracks by the width thereof expressed in tenths of millimeters.

According to the present invention it has been discovered that the ratio $I_r$ of the peak amplitude of the arch of maximum amplitude of the wave train picked up by the receiver R of the logging sonde to the peak amplitude of one of the two arches which are adjacent to this arch of maximum amplitude is representative of the degree of cracking.

The result may be explained by considering that in the vicinity of the arch of maximum amplitude of the wave train, the latter is essentially constituted by the wave corresponding to the transverse propagation or shear wave.

The determination of the above-indicated ratio thus corresponds to the application of the method according to the invention to a wave propagated in a transverse direction, which is particularly responsive to the horizontal permeability component which is itself susceptible to the cracks, whatever their orientations may be.

Figure 6:
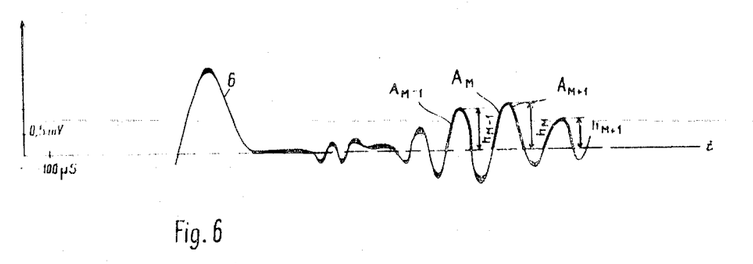
Figure 7:
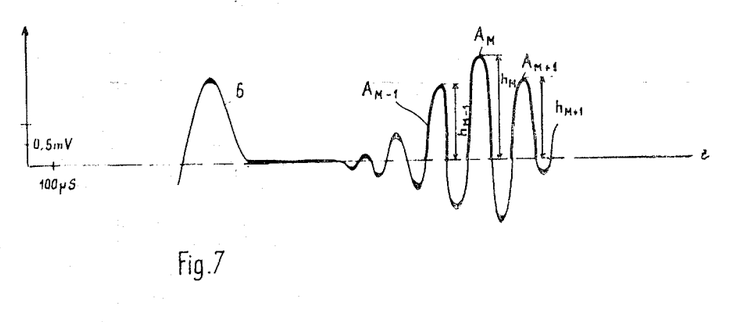

FIGS. 6 and 7 show two examples of acoustic wave trains picked up by the receiver R and sent to the oscilloscope. In these wave trains, only the arches adjacent to that of maximum amplitude have been considered, these useful arches being indicated by a reinforced line on the wave train.

The value of a parameter related to the peak amplitudes of these arches are determined. For each position of the logging sonde are measured the value of this parameter for the arch of maximum amplitude $h_M$ of the arch $A_M$ of maximum amplitude of the shear or transverse wave and the value of this parameter, for example the amplitude $h_{M'7E'1}$ or $h_{M+1}$ for one of the arches ($A_{M'7E'1}$ or $A_{M+1}$) adjacent to the arch of maximum amplitude in this shear wave, and one of the ratios $h_M/h_{M'7E'1}$ or $h_M/h_{MAI+1}$ is determined.

Figure 9:
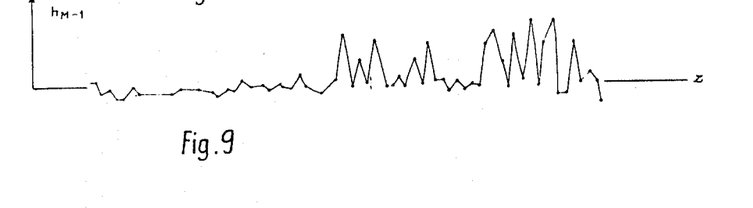
FIG. 9 shows for comparison purposes with the preceding diagram a log of permeability due to fractures or cracks, determined in accordance with the present invention.

By plotting the values taken by any of these ratios as a function of the depth, there is obtained a log such as the one of FIG. 9 which, compared with the diagram of FIG. 8, shows an excellent correlation with the degree of cracking of the formations traversed by the borehole.

Any of the ratios $h_M/h_{M'7E'1}$ or $h_M/h_{M+1}$ may thus be used to quantitatively represent the degree of the formations or their permeability through cracks, but the first ratio will however be preferably chosen.

In the case where two arches of the shear wave seem to have the same maximum amplitude, the ambiguity will be suppressed by choosing for $h_M$ the arch for which the tangent at the point corresponding to the beginning of the arch as the highest value.

The vertical cracks which have practically no influence on the value $I_c = h_3/h_1$ used for determining the log of FIG. 5 will, on the contrary, appreciably affect the values of $h_M/h_{M'7E'1}$ and $h_M/h_{MAI+1}$ since these values are determined from the transverse or shear wave.

It results from the foregoing that the present invention provides means for establishing a log of permeability (FIG. 5) which mainly represents the variations in the vertical permeability of the matrix of the formations traversed by a borehole and (FIG. 9) a log of combined permeability including the horizontal permeability as well as the permeability of the fractures.

Figures 10, 11:
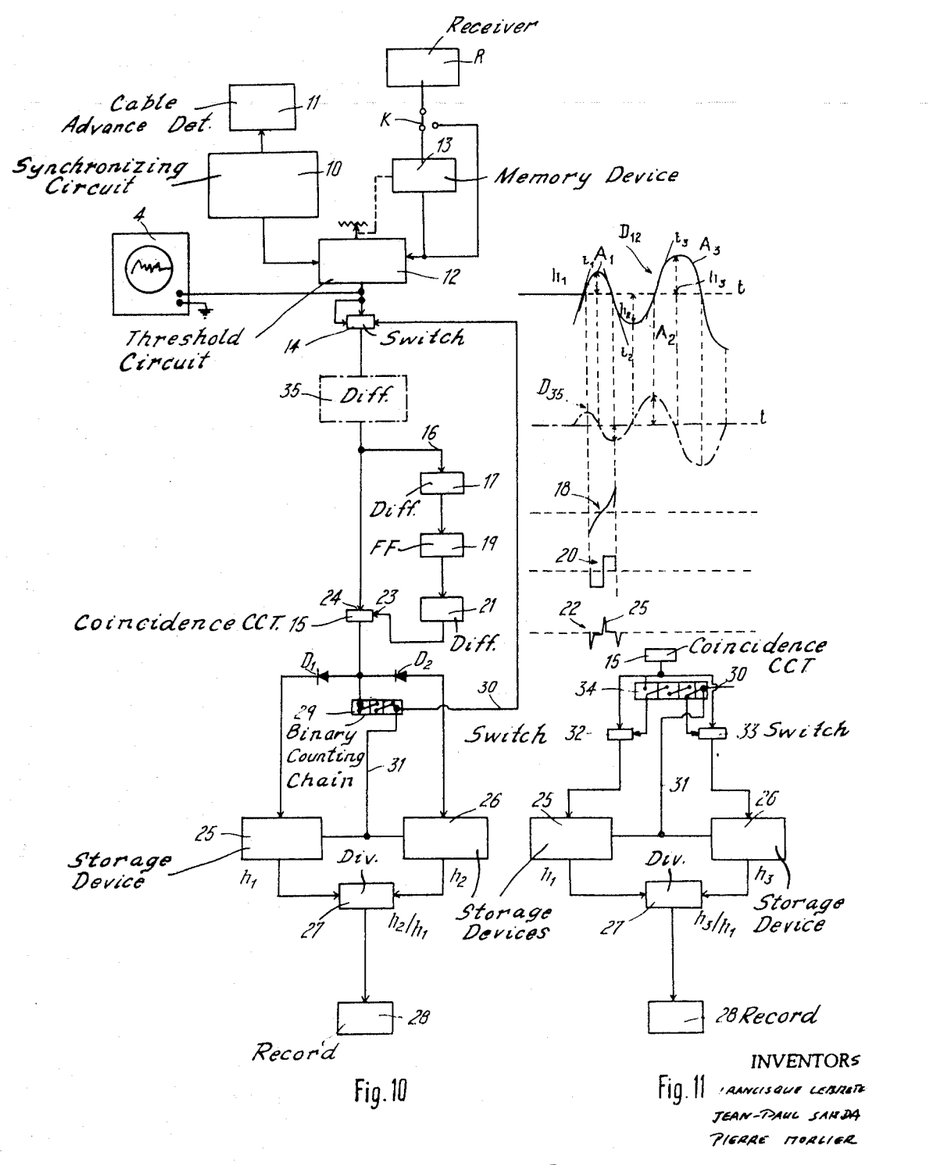

FIG. 10 illustrates, in the form of a diagram, an embodiment of an entirely automatic data-processing system device for carrying out the present invention, in order to, for example, measure a permeability or mobility index, such as the above-defined index $I_c$ and $I'_c$ at the different levels in the borehole.

On this diagram, 10 designates a synchronizing device which may be of any suitable known type, for establishing correspondence between the successive wave trains reaching the receiver R and the different levels of the borehole, marked by a device 11 for detecting the progression of the cable 5 supporting the logging sonde 2.

The device which is schematically shown by FIG. 10 includes means 12 for regulating the threshold of sensibility so as to only admit those arches of the wave train received by R, having an intensity higher than that of the background noise.

The adjustment of this threshold may for example be effected by a known memory device 23 for example a Memotron, during a preliminary test which may be performed during the lowering of the logging sonde in the borehole.

This conventional device effects a sampling of the ordinates and determines the algebraic sum of the samples having the same abscissa for $n$ measures at each level of the borehole.

If $n$ is high enough the influence of the noise disappears in this algebraic sum, as a result of the component characteristic of the noise (the average value of the components due to the noise is equal to zero).

This storage device makes it possible, by effecting during the lowering of the sonde within the borehole preliminary measurements having a purpose of indication, the smallest value of the peak amplitude of the longitudinal wave, and this device can automatically fix the threshold of sensibility of the device 12 (to which it is connected through the dotted line on FIG. 10) at a predetermined fraction of this minimum value, this fraction being so selected as to eliminate the influence of the noise on the subsequent measurements.

The switch K makes it possible to eventually disconnect the Memotron 13 during the raising of the logging sonde.

By using the Memotron during the whole logging operation it could be possible to remove this device 12 regulating the threshold at the reception.

The adjustment of this threshold of sensibility may be manually performed after having read on the screen of the oscilloscope during the lowering of the sonde the smallest value of the peak amplitude of the first arch.

The acoustic wave train at the output of 12 has for example the shape shown in $D_{12}$.

This wave train is applied to the input of means for detecting the first arch $A_1$ of the longitudinal or compressional wave, these means being for example constituted by the switch 14 the closing of which is controlled only by the reception of a signal of a predetermined polarity and the intensity of which is greater than the also predetermined threshold and then remains closed.

The part of the acoustic wave train beginning after this first arch is then directed to means for detecting the maximum amplitude of the successive arches.

In the illustrated embodiment this means comprises in combination a coincidence circuit 15 and a shunt 16 comprising, connected in series, a first differentiating circuit 17 which, for example, provides in response to the arch $A_1$ the signal 18 which is the first derivative of this arch with respect to time, a flip-flop circuit 19 and a second differentiating circuit 21, the respective output signals of which corresponding to the arch $A_1$ of the wave train are shown in 20 and 22 on FIG. 10.

The signal 22 is applied to one of the input terminals 23 of the coincidence circuit 15, the output signal of the switch 14 being applied to the other input terminal 24 of this circuit.

The signal 23 has a peak of the same polarity as the arch of wave train to which it corresponds, this peak corresponding to the passage of this arch through its maximum.

The coincidence circuit 15 is adapted to only transmit the signal applied to its terminal 24 during the short time interval corresponding to the application of a pulse having the same polarity, such as the peak 25, to its terminal, this pulse being preliminarily widened by an intermediary shaping circuit if necessary.

The wave train $D_{12}$ will thus only pass through the coincidence circuit 15 during the very short intervals corresponding to the instants when the successive arches reach their maximum values.

The output signal 15 corresponding to the different arches are directed to the storage devices 25, 26 measuring their intensities and storing the measurements.

The device 25 is used to measure the maximal amplitude of the arch $A_1$ and the device 26 corresponds to the arch $A_2$ in the chosen embodiment wherein the acoustic wave train received by the device R has the shape shown in $D_{12}$ on FIG. 10.

The output signals of the devices 25 and 26, which are respectively function of the peak amplitudes $h_1$ and $h_2$ of the arches $A_1$ and $A_2$ are applied to a divider 27 which is of known type determining in the form of an electric signal the ratio $h_1/h_{2a}$, this signal being applied to a recorder 28.

On this recorder thus appear the variations of the hereinabove defined index $I'_c = h_2/h_1$, representing the variations of the mobility $\kappa$ in the formations in the vicinity of the borehole as a function of the level of the sonde, which is marked through the synchronizing device 10.

A binary counting chain 29 constituted by three bistable flip-flops connected in series and the input of which is connected to the output terminal of 15 causes the resetting to zero of the measuring devices of the storage device 25 and 26 and the simultaneous opening of the switch 14 at the receiving of the third arch $A_3$ of each wave train.

In the illustrated embodiment this resetting to zero is effected by a pulse delivered by the third flip-flop of the counter 29 at the output terminal thereof, this control pulse being transmitted to the switch 14 and to both the devices 25 and 26 through the conductors 30 and 31 respectively.

The modification partially illustrated by FIG. 11 pertains to the case where the ratio $I_c = h_3/h_1$ is selected to represent the mobility in, or the permeability of, the studied formations.

This modification only differs in that the application of the output signal of the device 15 to either storage measuring devices 24 or 26 is effected through switching devices 32 or 33, the closing of which is respectively controlled by the arrival of an output pulse on the first (control of 32) and on the third (control of 33) flip-flops of a counting chain 34 constituted by four bistable flip-flops connected in series, corresponding to the passage of the first and third arches respectively to their maximum values.

The resetting to zero of the devices 25 and 26 and the opening of the switch 14 are simultaneously achieved, as hereinabove, by connecting the conductors 30 and 31 to the output terminal of the last flip-flop of the chain 34.

It is possible to adapt the devices which have been described above, with reference to FOG. 10 or to FIG. 11, to the case where there is selected as parameters related to the respective peak amplitudes of the first arches of the acoustical wave train, the respective slopes of the tangents $(t_1, t_2, t_3)$ to these arches at the beginning of the receipt thereof or at the point of inflexion of each of said arches.

It is sufficient for this purpose to connect between the output terminal of the switch 14 and the shunt 16 a differentiator 35 which will deliver in response to the signal $D_{12}$ the signal $D_{35}$ representating the derivative of the signal $D_{12}$ with respect to the time and appearing on the output terminals of 35. Measuring the ratios of the slopes of $t_1, t_2, t_3$ leads to measuring the ratios of the height of successive arches of the derived signal $D_{35}$, i.e., to the problem which has already been solved.

Another embodiment consists in using in the device shown by FIG. 10, in addition to the differentiator, a shunt replacing the shunt 16 and connected between the output of the switch 14 and the input 23 of the coincidence device 24, the latter being adapted to only transmit a signal when the signal leaving 14 and applied to 23 is equal to zero, which corresponds to the respective beginnings of the different arches, the output signal of 15 being then equal to the slop of the tangent at the corresponding point of the arch.

In the case of logging within a borehole which as been drilled using drilling mud with filtrate, as defined hereinabove, a particularly interesting embodiment of the invention consists in using at least two different frequencies at the emission, corresponding to different distances of investigation from the borehole wall, the depth of penetration of the acoustic waves varying in inverse proportion with their frequency, applying the method of the invention for the two frequencies respectively and comparing the mobilities $K/\mu$ measured at a same level of the borehole with the two frequencies of emission separately, which makes it possible, assuming that the permeability does not vary much as a function of the distance to the borehole axis in the vicinity of the latter, to detect the variations in viscosity of the fluids impregnating the formations at a fixed level, as a function of the distance to the borehole axis.

Figure 12:
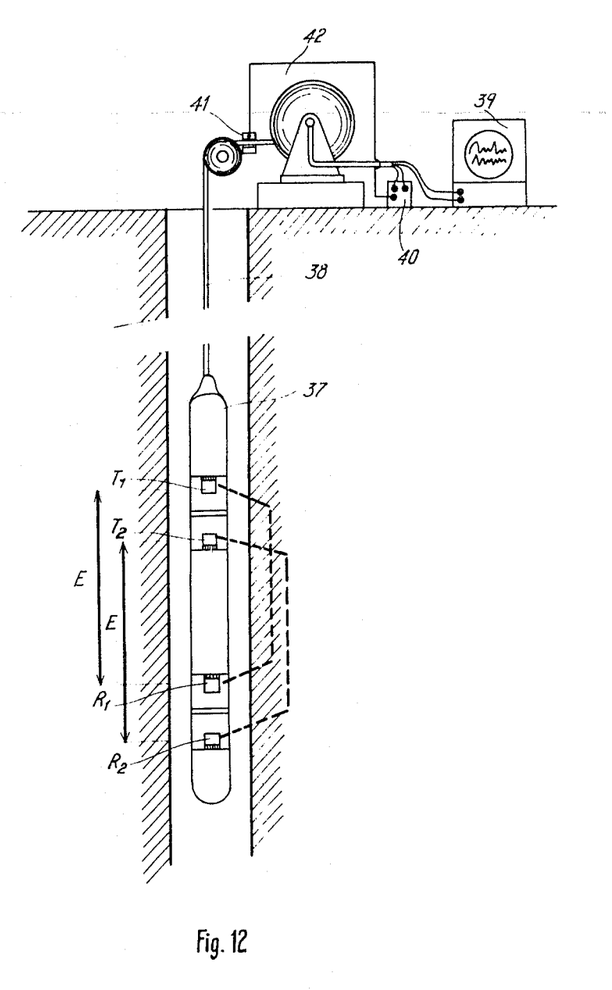
FIG. 12 illustrates a particularly interesting embodiment for carrying out the invention.

A type of device which can be used to carry out this embodiment of the method according to the invention is schematically shown by FIG. 12.

This device includes a logging sonde 37 of a type conventional in acoustical logging, with two transmitters $T_1$ and $T_2$ and two receivers $R_1$ and $R_2$ with the same spacing between the two transmitters and between the two receivers.

One of the transmitters, for example the transmitter $T_1$, transmits acoustical signals having a frequency which may be comprised between 20,000 and 80,000 Hertz and the other transmits signals with a frequency which may be comprised between 2,000 and 20,000 Hertz, for example between 5,000 and 10,000 Hertz.

The transmitters are so constructed as to transmit spherical waves and may either be of the magnetostrictive or piezoelectric type, provided in the last case, that a suitable shape is given to the piezoelectric quartz.

The receiver $R_1$ is tuned to the emitting frequency of $T_1$ and the receiver $R_2$ is tuned to the frequency of the transmitter $T_2$.

The respective signals received by these two receivers are transmitted to the ground surface through the cable 38 and may be read on the respective screens of two oscilloscopes or, advantageously, on the screen of one of the same oscilloscope 39 having two input channels.

An electronic device 40 for sequentially controlling the operation of each transmitter $T_1$ and $T_2$ causes their successive actuation as the sonde 37 is progressively raised.

The time interval $\Delta t$ between an excitation of the transmitter $T_1$ and the following excitation applied to the transmitter $T_2$, is so adjusted by the device 40 that the product $V \cdot \Delta t$ is equal to D, D being the distance between the two transmitters and V the speed at which the sonde is raised, measured by a detecting device 41 which may be of any suitable type and which is connected to the device 40 by conductors 42 for controlling the actuation of the successive emissions as a function of the speed at which the sonde is raise.

Under these conditions, the transmitters $T_1$ and $T_2$ successively emit at the same level in the borehole during the raising.

The number of signals transmitted for each interval equal to one meter when rasing the sonde is thus equal to $1/T_1 T_2$, the distance $T_1 T_2$ being expressed in meters. For example one may choose $T_1 T_2 = 0.25$ meter and the total number of transmitted signals (on the two frequencies) will then be four per meter (which corresponds to one signal per second for a normal speed of raising equal to 0.25 m./sec. or 900 m./hr.).

The spacing $E = T_1 R_1 \times T_2 R_2$, measured along a vertical within the formation, will preferably contain at least one wavelength corresponding to the lower of the two emission frequencies. For example, if the lower of the two emission frequencies if 5,000 Hz. assuming for the velocity of propagation of the acoustic waves the maximum value of 7,000 m./sec., corresponding to the propagation in the "fastes" sedimentary layers, one will chose:

$$E \; \lambda = 7,000/5,000 = 1.40 \text{ meter}$$

The signals which are respectively received by the receivers $R_1$ and $R_2$ and appear on the screen of the oscilloscope 39 may be photographed on a film which is unreeled at the speed of raising the sonde, with the indication of the different depths on this film.

These signals will be analyzed separately according to the method according to the invention which has been hereinabove described, using for example, a fully automatic device of a type already described, for determining the mobility $K/\mu$ by an index such as one of the above-defined indices $I_c$ and $I'_c$.

There will be so obtained two logs for the two emission frequencies, corresponding to two different distances of penetration of the acoustic waves into the formations surrounding the borehole, from the wall thereof.

Calibration of each of these logs in terms of mobility $K/\mu$ will be achieved at the ground surface using artificial grounds of known homogenous permeability and of sufficient volume, constituted, for example, by a cylindrical sleeve filled up with a porous material which may be constituted of glass balls or of grains of sintered metal, treated by suitable heating, the interstices between the balls or the grains being moreover filled by a liquid of known viscosity, such as for example, a lubricating oil.

The interpretation of the so-obtained recordings of the two logs will be realized by comparing the values of the mobility $K/\mu$ in each ground section at different distances from the borehole wall, corresponding to the two frequencies which have been used.

Since the permeability can practically be considered as constant in a sedimentary formation, in the range of the volumes traversed by the waves between the transmitters and the receivers, the comparison of the two values of $K/\mu$ obtained for the two emission frequencies respectively, at one and the same level, makes it possible to detect the lateral variations of the viscosity of the fluids impregnating the formations in the intervals of the measurements and for the diameter of the lateral extent of the wave penetration around the borehole.

For each of the two frequencies separately the log will give an indication on the variations of the mobility $K/\mu$ in the zone of penetration of this frequency.

Figure 15:
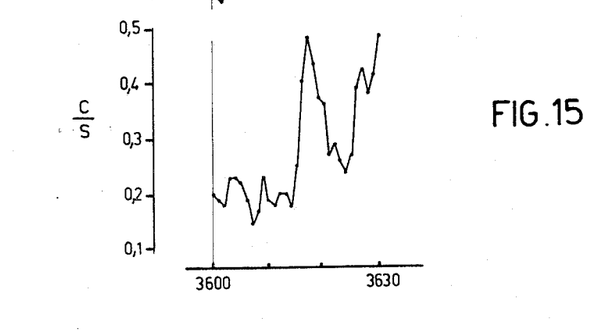
FIG. 15 shows for another well a prior art log.
Figure 16:
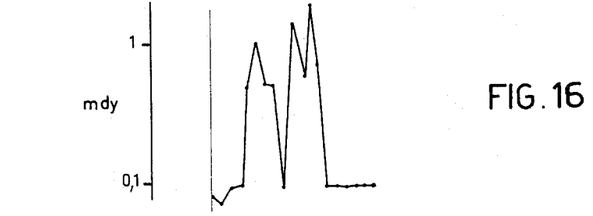
FIG. 16 shows the corresponding variations in the permeability measured on large cores.
Figure 17:
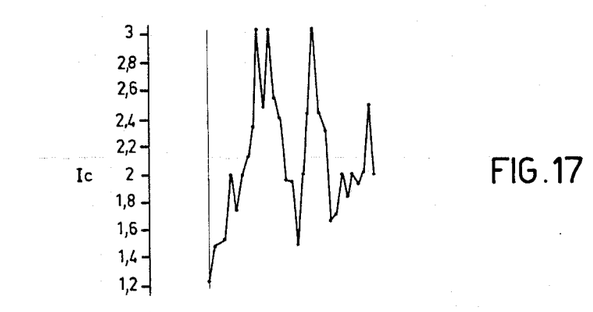
FIG. 17 illustrates the permeability log obtained in the same well according to the invention.

FIGS. 15, 16, and 17 show experimental results over the interval 3,600 feet to 3,630 feet of a well, FIG. 15 representing the above-defined prior art C/S log according to the teaching of U.S. Pat. No. 3,362,011 and FIG. 17 showing the variations of our $I_c$ index along the same interval. FIG. 16 shows the corresponding variations in measured permeability. It can be seen that the values given by the prior art C/S ratio log (FIG. 15) are significantly different from the actual large core permeability (FIG. 16):

a. this prior art log does not indicate the high permeability of a sand layer located between 3,606 and 3,612 feet, this layer being, by the way, oil bearing and producing (its permeability is equal to 1 millidarcy), b. from 3,625 to 3,630 feet there was found a dolomite with no sand and no porosity, its permeability being lower than 0.1 millidarcy, whereas the prior art C/S ratio log gives for this interval the highest permeability of the whole reservoir.

On the contrary, our $I_c$ log (FIG. 17) distinctly shows all the permeable and all the impervious beds of the reservoir.

The bad results obtained by the application of the prior art method may be explained by noticing that this method ignores the permeability of the formations traversed by the acoustic signal on the shear wave, the C/S log thus mingling the properties of two wave train components which actually travel differently through the geological formations.

On the contrary, our $I_c$ and $I_t$ ratio signals are each derived from separate components of the wave train and thus give valuable complementary informations concerning respectively the matrix permeablity and the fracture occurrence in the investigated geological formations and the logs established according to the method of this invention are by no way affected by the "false permeability" due to the clay content of the formations.

It is therefore apparent that the present invention provides new and exact informations relative to the ground layers traversed by a borehole, which were not obtainable up to now by any other method including that described in U.S. Pat. No. 3,362,011.

What is claimed is:

1. In acoustic well logging wherein repetitive acoustic impulses from a source are each detected at a detector which is moved through a borehole in fixed spaced relationship with said source, to produce electrical signals, each having a first portion representative of a first arriving compressional wave having at least one component formed of a series of successive arches and a second portion representative of a later arriving shear wave, the method of determining mobility characteristics $K/\mu$ of the fluids impregnating the subsurface formations adjacent said borehole, comprising isolating from at least one and the same component of said compressional wave, one pair of arches from the three first arches of said component, producing a ratio signal representative of the ratio of corresponding values of the two arches of said pair of arches, and recording said ratio signal in correlation with depth to provide an information as to said mobility.

2. A method according to claim 1, wherein said ration signal is substantially proportional to the ratio of the peak amplitudes of said two arches respectively.

3. A method according to claim 1, wherein said ration signal is substantially proportional to the ratio of the slopes of said two arches respectively at their point of inflexion.

4. A method according to claim 1, wherein said ratio signal is substantially proportional to the ratio of the respective areas of said two arches.

5. A method for determining logs of mobility $K/\mu$ of the fluids saturating the geological formations surrounding a borehole, $K$ being the permeability of these formations and $\mu$ the viscosity of the saturating fluid, so as to evaluate this mobility for at least two different distances of penetration from the borehole wall, comprising at least two series of operations such that each series corresponds to the application of the method according to claim 1 with an emission frequency of the acoustic impulses which is different from that used for the other series.

6. Method for evaluating the variations in the viscosity of fluids impregnating a geological formation traversed by a borehole as a function of the distance of the impregnated zones of said formation from the borehole wall, consisting in successively transmitting at the level of this formation at least two acoustic impulses of different frequencies corresponding to different depths of penetration into said formation, receiving corresponding signals after propagation through said formation, determining for each received signal the ratio $K/\mu$ according to the method of claim 1 and recording the respective values of this ratio for said two signals in correlation with depth.

7. In acoustic well logging wherein repetitive acoustic impulses from a source are each detected at a detector which is moved through a borehole in fixed spaced relationship with said source, to produce electrical signals, each having a first portion representative of a first arriving compressional wave and a second portion representative of a later arriving shear wave having at least one component, the method of determining mobility characteristics of the fluids impregnating the subsurface formations adjacent said borehole, comprising, isolating from at least one and the same component of said shear wave one pair of adjacent arches of the same polarity, including the arch of maximum amplitude of said shear wave component.

8. A method according to claim 7, wherein said ratio signal is substantially proportional to the ratio of the peak amplitudes of said two arches respectively.

9. A method according to claim 7, wherein said ratio signal is substantially proportional to the ratio of the respective areas of said two arches.

10. Method for evaluating the variations in the viscosity of fluids impregnating a geological formation traversed by a borehole as a function of the distance of the impregnated zones of said formation from the borehole wall, consisting in successively transmitting at the level of this formation at least two acoustic impulses of different frequencies corresponding to different depths of penetration into said formation, receiving corresponding signals after propagation through said formation, determining for each received signal the ratio $K/\mu$ according to the method of claim 7 and recording the respective values of this ratio for said two signals in correlation with depth.

11. In acoustic well logging wherein repetitive acoustic impulses from a source are each detected at a detector which is moved through a borehole in fixed spaced relationship with said source, to produce electrical signals, each having a first portion representative of a first arriving compressional wave and a second portion representative of a later arriving shear wave having at least one component, the method of determining mobility characteristics of the fluids impregnating the subsurface formations adjacent sad borehole, comprising, isolating from at least one and the same component of said shear wave one pair of adjacent arches of the same polarity, including the arch of maximum amplitude of said shear wave component, producing a ratio signal representative of the slopes of the tangents to the two arches of said pair at the respective points of inflexion of said arches, and recording said ratios and in correlation with depth to provide an information as to said mobility.

12. A method for determining logs of mobility $K/\mu$ of the fluids saturating the geological formations surrounding a borehole, $K$ being the permeability of these formations and $\mu$ the viscosity of the saturating fluid, so as to evaluate this mobility for at least two different distances of penetration from the borehole wall, comprising at least two series of operations such that each series corresponds to the application of the method according to claim 11, with an emission frequency of the acoustic impulses which is different from that used for the other series.

13. Method for evaluating the variations in the viscosity of fluids impregnating a geological formation traversed by a borehole as a function of the distance of the impregnated zones of said formation from the borehole wall, consisting in successively transmitting at the level of this formation at least two acoustic impulses of different frequencies corresponding to different depths of penetration into said formation, receiving corresponding signals after propagation through said formation, determining for each received signal the ratio $K/\mu$ according to the method of claim 11 and recording the respective values of this ratio for said two signals in correlation with depth.

14. A method for determining logs of mobility $K/\mu$ of the fluids saturating the geological formations surrounding a borehole, $K$ being the permeability of these formations and $\mu$ the viscosity of the saturating fluid, so as to evaluate this mobility for at least two different distances of penetration from the borehole wall, comprising at least two series of operations such that each series corresponds to the application of the method according to claim 7 with an emission frequency of the acoustic impulses which is different from that used for the other series.

15. In acoustic well logging wherein repetitive acoustic impulses from a source are each detected at a detector which is moved through a borehole to produce electrical signals, each having a first portion representative of a first arriving compressional wave having at least one component and a second portion representative of a later arriving compressional wave having at least one component, said first and second portions each consisting of a series of successive arches, the method of determining at least a value derived from fixed arches of selected components of each of said signals, comprising the steps of transmitting a first acoustic impulse at a high frequency from said source, receiving at the detector at least one corresponding first electrical signal where of the components are distinctly separated from one another, transmitting from said source at least one second acoustic impulse at a lower frequency than that of said first acoustic impulse, said second frequency corresponding to a higher penetration of said second impulse into the ground, receiving at least one corresponding second signal at the receiver, the components of which are located closer to one another than that of said first signal, separating the component of said second signal by a correlation between said first and second signals, producing a ratio signal representative of the ratio of corresponding values of the two arches of said pair of arches, and recording said ratio signal in correlation with depth to provide an information as to said mobility.

16. A device for determining acoustic logs of mobility of the saturating fluids in the geological formations surrounding a borehole, including a sonde displaceable through the borehole, transmitter means for transmitting substantially identical signals from a first level of said sonde, receiver means for receiving said signals after they have travelled through said formations, said signals each having a first portion representative of a first arriving compressional wave having at least one component formed of a series of successive arches, including identifying means connected to said receiver for separating in at least one and the same component of said compressional wave one pair of arches from the three first arches of said component, means connected to said identifying means for dividing corresponding values of the two arches of each pair of arches one by the other for producing ratios and means for recording said ratios in correlation with depth to provide an information as to said mobility, said means for dividing said values including first deriving means for differentiating said received signals with respect to time and second differentiating means connected to said first differentiating means for locating the first point of inflexion of each of said arches.

17. A device for determining acoustic logs of mobility of the saturating fluids in the geological formations surrounding a borehole, including a sonde displaceable through the borehole, transmitter means for transmitting substantially identical signals from a first level of said sonde, receiver means for receiving said signals after they have traveled through said formations, said signals each having at least one component formed of a series of successive arches, including identifying means connected to said receiver, for separating in at least one and the same component of said compressional wave one pair of arches from the three first arches of said component, means connected to said identifying means for dividing corresponding values of the two arches of each pair of arches one by the other for producing ratios and means for recording said ratios in correlation with depth to provide an information as to said mobility, said means for dividing said values including means for differentiating the received signals to locate the time of maximum amplitude of each of said arches.

18. A device for determining acoustic logs of mobility of the saturating fluids in the geological formations surrounding a borehole, including a sonde displaceable through the borehole, transmitter means for transmitting substantially identical signals from a first level of said sonde, receiver means for receiving said signals after they have traveled through said formations, said signals each having a first portion representative of a first arriving compressional wave having at least component formed of a series of successive arches, including means connected to said receiver, for separating in at least one and the same component of said compressional wave one pair of arches from the three first arches of said component, means connected to said identifying means for dividing corresponding values of the two arches of each pair of arches one by the other for producing ratios and means for recording said ratios in correlation with depth to provide an information as to said mobility, said means for dividing said values including first means for differentiating said received signals with respect to time and second differentiating means connected to said first deriving means to locate the first point of inflexion of each of said arches.

19. In acoustic well logging wherein repetitive acoustic impulses from a source are each detected at a detector which is moved through a borehole in fixed spaced relationship with said source, to produce electrical signals, each having a first portion representative of a first arriving compressional wave having at least one component formed of series of successive arches and a second portion representative of a later arriving shear wave, in combination with an automatic data-processing system determining mobility characteristics $K/\mu$ of the fluids impregnating the subsurface formations adjacent said borehole, the method comprising isolating from at least one and the same component of said compressional wave one pair of arches from the three first arches of said component, producing in said automatic data-processing system a value representative of the ratio of corresponding values of the two arches of each pair one by the other, and recording said value in correlation with depth to provide information as to said mobility.

20. A method according to claim 19, wherein said corresponding values are substantially proportional to the peak amplitude of said two arches respectively.

21. A method according to claim 19, wherein said corresponding values are substantially proportional to the slope of said two arches respectively at their point of inflexion.

22. A method according to claim 19, wherein said corresponding values are substantially proportional to the respective areas of said two arches.

23. In acoustic well logging wherein repetitive acoustic impulses from a source are each detected at a detector which is moved through a borehole in fixed spaced relationship with said source, to produce electrical signals, each having a first portion representative of a first arriving compressional wave and a second portion representative of a later arriving shear wave having at least on component, in combination with an automatic data-processing system determining mobility characteristics of the fluids impregnating the subsurface formations adjacent said borehole, the method comprising isolating from at least one the same component of said shear wave one pair of adjacent arches of the same polarity, including the arch of maximum amplitude of said shear wave component, producing in said automatic data-processing system a value representative of the ratio of corresponding values of the two arches of each pair one by the other, and recording said value in correlation with depth to provide information as to said mobility.

24. A method according to claim 23, wherein said corresponding values are substantially proportional to the peak amplitude of said two arches respectively.

25. A method according to claim 23, wherein said corresponding values are substantially proportional to the respective areas of said two arches.

26. In acoustic well logging wherein repetitive acoustic impulses from a source are each detected at a detector which is moved through a borehole in fixed spaced relationship with said source, to produce electrical signals, each having a first portion representative of a first arriving compressional wave and a second portion representative of a later arriving shear wave having at least one component, in combination with an automatic data-processing system determining mobility characteristics of the fluids impregnating the subsurface formations adjacent said borehole, the method comprising isolating from at least one and the same component of said shear wave one pair of adjacent arches of the same polarity, including the arch of maximum amplitude of said shear wave component, producing in said automatic data-processing system a value representative of the ratio one by the other of the values of the slopes of the tangents to the two arches of said parts at the respective points of inflexion of said arches, and recording said value in correlation with depth to provide information as to said mobility.

* * * * *